US011756304B2

United States Patent
Dugan

(10) Patent No.: US 11,756,304 B2
(45) Date of Patent: *Sep. 12, 2023

(54) METHODS AND APPARATUS FOR REMOVING SATELLITE TRAILS FROM IMAGES AND/OR FITTING TRAIL WOBBLE

(71) Applicant: Owen M. Dugan, Sleepy Hollow, NY (US)

(72) Inventor: Owen M. Dugan, Sleepy Hollow, NY (US)

(*) Notice: Subject to any disclaimer, the term of this patent is extended or adjusted under 35 U.S.C. 154(b) by 82 days.

This patent is subject to a terminal disclaimer.

(21) Appl. No.: 17/362,945

(22) Filed: Jun. 29, 2021

(65) Prior Publication Data

US 2021/0407060 A1 Dec. 30, 2021

Related U.S. Application Data

(60) Provisional application No. 63/045,814, filed on Jun. 29, 2020.

(51) Int. Cl.
*G06V 20/52* (2022.01)
*G06T 5/50* (2006.01)
(Continued)

(52) U.S. Cl.
CPC ............ *G06V 20/52* (2022.01); *G02B 23/12* (2013.01); *G06T 5/50* (2013.01); *G06T 7/174* (2017.01);
(Continued)

(58) Field of Classification Search
CPC combination set(s) only.
See application file for complete search history.

(56) References Cited

U.S. PATENT DOCUMENTS

| 2006/0110007 A1 | 5/2006 | Yanigasawa et al. |
| 2017/0140239 A1 | 5/2017 | Saito |

(Continued)

FOREIGN PATENT DOCUMENTS

CN 109708648 * 5/2019 ............ G01C 21/24

OTHER PUBLICATIONS

PixInsightReferenceDocumentation, "Rejection Maps", 2013, Pixinsight.com, https://pixinsight.com/doc/tools/ImageIntegration/ImageIntegration.html#usage_008 (Year: 2013).*

(Continued)

*Primary Examiner* — Zhiyu Lu
(74) *Attorney, Agent, or Firm* — Dugan & Dugan, PC

(57) ABSTRACT

A method for removing satellite trails from images includes the following: obtaining an initial image having stars, locating stars in the image, removing the located stars from the initial image to form a star-removed image, locating the satellite trail in the star-removed image, determining brightness information for the satellite trail in the initial image including trail wobble information, creating a satellite-trail-containing image with only satellite trail brightness information based on the determined brightness information, and subtracting the satellite-trail-containing image from the initial image to remove the satellite trail so as to form a satellite-trail-removed image. Systems for removing satellite trails from images are also provided, as are other aspects.

20 Claims, 8 Drawing Sheets

(51) Int. Cl.
    G02B 23/12    (2006.01)
    G06T 7/174    (2017.01)
    G06V 10/60    (2022.01)
    G06V 20/30    (2022.01)
(52) U.S. Cl.
    CPC .............. G06V 10/60 (2022.01); G06V 20/30 (2022.01); *G06T 2207/10032* (2013.01); *G06T 2207/20224* (2013.01)

(56) References Cited

U.S. PATENT DOCUMENTS

2018/0357753 A1* 12/2018 Lehtinen .................. G06N 3/08
2021/0142451 A1    5/2021 Dugan
2022/0383614 A1* 12/2022 Wu ......................... G06T 5/008

OTHER PUBLICATIONS

Richard S. Wright Jr., "Satellites, Begone! Remove Trails From Your Astrophotography", Jun. 2019, Skyandtelescope.org, https://skyandtelescope.org/astronomy-blogs/imaging-foundations-richard-wright/satellites-begone-how-to-remove-satellite-trails-from-your-astrophotography/ (Year: 2019).*

Paillassa et al., "MaxiMask and MaxTrack: Two new tools for identifying contaminants in astronomical images using convolutional neural networks", 2020, Astronomy Astrophysics, https://arxiv.org/pdf/1907.08298 (Year: 2020).*

Matt Hill, "4 Ways to remove airplanes from star stacks", Aug. 2018, nationparksatnight.com, https://www.nationalparksatnight.com/blog/2018/8/18/four-ways-to-remove-airplanes-from-star-trails-in-post-production (Year: 2018).*

"Gaussian Function." Wikipedia. (Year 2007).

Desai, S. et al. "Detection and removal of artifacts in astronomical images." Astronomy and computing 16 (2016): 67-78 (Year: 2016).

Hainaut, O. "Retouching of astronomical data for the production of outreach images." May 20, 2009. <https://www.eso.org/~ohainaut/images/imageProc.html> (Year 2018).

Hallas, T. "What to do about satellite trails." Jan. 23, 2012. Astronomy.com (Year 2012).

Melchior, P. et al. "Crowdsourcing quality control for Dark Energy Survey images." Astronomy and Computing 16 (2016): 99-108. (Year: 2016).

Morganson, E. et al. "The dark energy survey image processing pipeline." Publications of the Astronomical Society of the Pacific 130.989 (2018): 074501. (Year 2018).

Privett, G. et al. "Automated Extraction of Satellite Trails from Wide Angle CCD Imagery." Revista Mexicana de Astronomica y Astrofisica Conference Series. vol. 51. 2019. (Year:2019.

Sease, B.J. Data Reduction for Diverse Optical Observers Through Fundamental Dynamic and Geometric Analysis. Diss.Virginia Tech, 2016. (Year: 2016).

Stetson, P. "DAOPHOT: A computer program for crowded-field stellar photometry." Publications of the Astronomical Society of the Pacific 99.613 (1987): 191. (Year 1987).

"subtract v." OED Online, Oxford University Press, Jun. 2022, www.oed.com/view/Entry/193201. Accessed Jun. 24, 2022. (Year: 2022).

Non-final Office Action of U.S. Appl. No. 17/096,945 dated Jan. 12, 2022.

Jun. 13, 2022 Reply to Non-Final Office Action of U.S. Appl. No. 17/096,945.

Final Office Action of U.S. Appl. No. 17/096,945 dated Jun. 30, 2022.

Aug. 30, 2022 Reply to Final Office Action of U.S. Appl. No. 17/096,945.

* cited by examiner

US 11,756,304 B2

METHODS AND APPARATUS FOR REMOVING SATELLITE TRAILS FROM IMAGES AND/OR FITTING TRAIL WOBBLE

The present application claims the benefit of U.S. Provisional Patent Application No. 63/045,814, filed Jun. 29, 2020, which is hereby incorporated by reference herein in its entirety for all purposes.

FIELD

The present application relates to removing satellite trails from images.

BACKGROUND

Ground-based telescopes image celestial bodies, such as planets, stars, galaxies, and nebula. When a satellite passes through a portion of sky being imaged, reflections from the satellite may be captured by the ground-based telescopes. Thus, recorded images may include satellite reflections, which appear as satellite trails. These satellite trails may ruin images visually. When recorded image are used to make photometry measurements, satellite trails cause inaccurate photometry measurements. Therefore, a need exists for removing satellite trails from images.

SUMMARY

In some embodiments, a method of removing a satellite trail from an image is provided that includes the following: obtaining an initial image having stars, locating stars in the image, removing the located stars from the initial image to form a star-removed image, locating the satellite trail in the star-removed image, determining brightness information for the satellite trail in the initial image including trail wobble information, creating a satellite-trail-containing image with only satellite trail brightness information based on the determined brightness information, and subtracting the satellite-trail-containing image from the initial image to remove the satellite trail so as to form a satellite-trail-removed image.

In some embodiments, a system for removing a satellite trail from an image is provided that includes a telescope having an imaging device. The system also includes a controller in communication with the telescope. The controller includes a memory for storing instructions that when executed by the controller cause the controller to perform the following: receive an initial image having stars, locate stars in the image, remove the located stars from the initial image to form a star-removed image, locate the satellite trail in the star-removed image, determine brightness information for the satellite trail in the initial image including trail wobble information, create a satellite-trail-containing image with only satellite trail brightness information based on the determined brightness information, and subtract the satellite-trail-containing image from the initial image to remove the satellite trail so as to form a satellite-trail-removed image.

Other features and aspects of the present invention will become more fully apparent from the following detailed description, the appended claims, and the accompanying drawings

DETAILED DESCRIPTION

Figure 1:
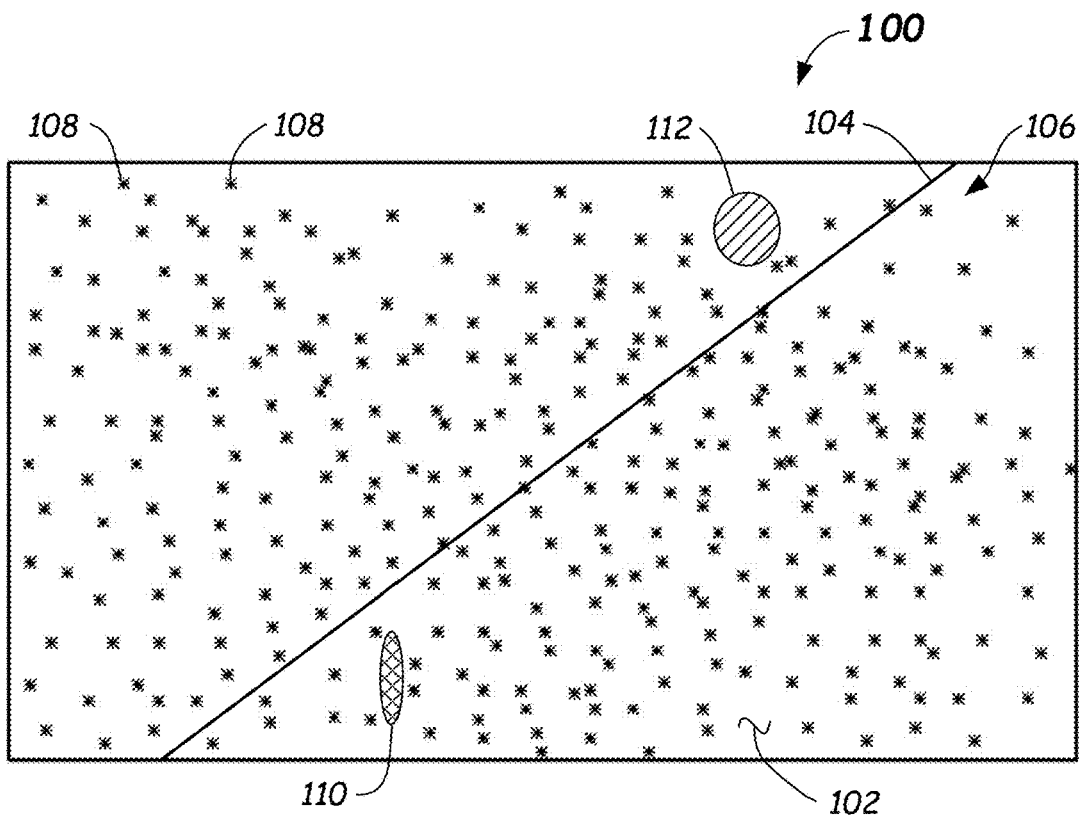
FIG. 1 illustrates an initial image of a night sky, wherein a satellite trail traversing at least a portion of the field of view of the initial image has been captured in the initial image according to one or more embodiments.

The number of satellites orbiting the Earth continues to increase. For example, worldwide internet access is being implemented by a large number (e.g., 42,000) satellites placed in Earth orbit. The large number of satellites may significantly degrade ground-based telescopes due to satellites passing through the fields of view of the telescopes as images are captured.

The satellite trails effect brightness measurements of stars the satellites pass in front of and stars in the vicinity of the satellite trails. For example, when a satellite passes through the field of view of a telescope capturing an image, the resulting satellite trail can cause inaccurate astronomical measurements related to that image. For example, reflections from the satellite produce a satellite trail extending through the image with a brightness that is normally distributed as a function of distance to the center of the satellite trail. The satellite trail is superimposed with all other objects in the image causing at least portions of the image to be brighter than an image without the satellite trail. Thus, the brightness of a pixel in the satellite trail varies with respect to the position of that pixel relative to the trail. The result is that some objects in the image appear artificially brighter than others. Based on the foregoing, satellite trails alter parameters and/or characteristics (e.g., such as photometry) that the imaging seeks to measure. Generally, if a satellite or satellite trail is observed in an image, the image must be discarded. Because the number of satellites is increasing, more images will need to be discarded.

Methods, apparatus, devices, and telescopes described herein remove satellite trails from images, which reduces the effects of the satellite trails on the photometry. In some embodiments, the methods include obtaining (e.g., capturing) an initial image having at least one celestial body. The initial image may be a digital image including a plurality of pixels or pixel values that may be analyzed by a program (e.g., software) executing on a computer. Celestial bodies include stars, galaxies, planets, nebulas, and other objects typically imaged by telescopes. The methods continue with locating light-emitting objects other than the satellite trail in the initial image. The light-emitting objects may be celestial bodies and/or outlier pixels (e.g., defective pixels) in an imaging device that generate data indicative of bright light. The light-emitting objects are removed from the initial image to form a star-removed image. With the light-emitting objects removed, the satellite trail in the star-removed image can be determined. When the satellite trail is located, brightness information of the satellite trail in the initial image is determined. In some embodiments, a brightness function of the satellite trail is generated based on the brightness information. The satellite trail is then removed from the initial image. The subtracting may be at least partially based on the brightness function of the satellite trail.

These and other methods, apparatus, and telescopes that remove satellite trails are described in detail with reference to FIGS. 1-14 herein.

Reference is made to FIG. 1, which illustrates an initial image 100 of a night sky 102, wherein a satellite trail 104 traversing at least a portion of the field of view of the initial image 100 has been captured. The initial image 100 includes at least one celestial body. A celestial body is an item in the sky other than a satellite trail that may be imaged by a telescope (not shown in FIG. 1). In the embodiment of FIG. 1, the initial image 100 includes a plurality of celestial bodies 106 including stars 108 (a few labelled), a galaxy 110, and a nebula 112. Other initial images may include other celestial bodies.

The initial image 100 of the night sky 102 may be captured by digital imaging. During digital imaging, an image of the night sky 102 is focused onto an imager, which may include a plurality of imaging components. In some embodiments, the imager is a substrate and the imaging components are charge-coupled devices (CCDs) mounted to the substrate. Each of the individual imaging components generates a signal (e.g., a voltage) that is proportional to the intensity of light and/or period of time that light is incident on the individual imaging components. The signals generated by the individual components are processed as image data to form an image including discrete picture elements (pixels). In some embodiments, the picture elements and the imaging components are both referred to as pixels.

Imaging of the night sky 102 may require focusing an image of the night sky 102 onto the imaging components for an extended period. For example, some of the celestial bodies 106 may be faint and may require extended imaging periods to generate usable signals from the imaging components. During the imaging period, light from light-emitting objects, including the celestial bodies, generate image data. Should a satellite (not shown) pass through the field of view during the imaging period, light reflected from the satellite will be imaged as the satellite passes through the field of view. The image data resulting from the satellite is the satellite trail 104.

The satellite trail 104 may result in inaccurate astronomical measurements of celestial bodies 106 in the initial image 100. Image photometry is particularly adversely affected by the satellite trail 104. The satellite trail 104 is a line through the initial image 100 wherein the brightness of satellite trail 104 is normally distributed as a function of distance to the center of the line. The satellite trail 104 is superimposed with all other objects, including the celestial bodies 106, in the initial image 100, which causes the initial image 100 or a portion of the initial image 100 to appear brighter than it really is. For example, the brightness of the satellite trail 104 at a specific pixel in the initial image 100 varies with respect to the position of that specific pixel relative to the satellite trail 104, which causes some of the celestial bodies 106 in the initial image 100 appear artificially brighter than they should.

Because satellite trails alter what photometry seeks to measure, the satellite trails can significantly impact photometry measurements. In conventional imaging, if a satellite or satellite trail is observed in an image, the image is discarded. This is an extremely inefficient use of images, especially as the number of satellites increases. The methods, apparatus, and telescopes described herein remove satellite trails without significantly affecting images of the celestial bodies 106.

Figure 2:
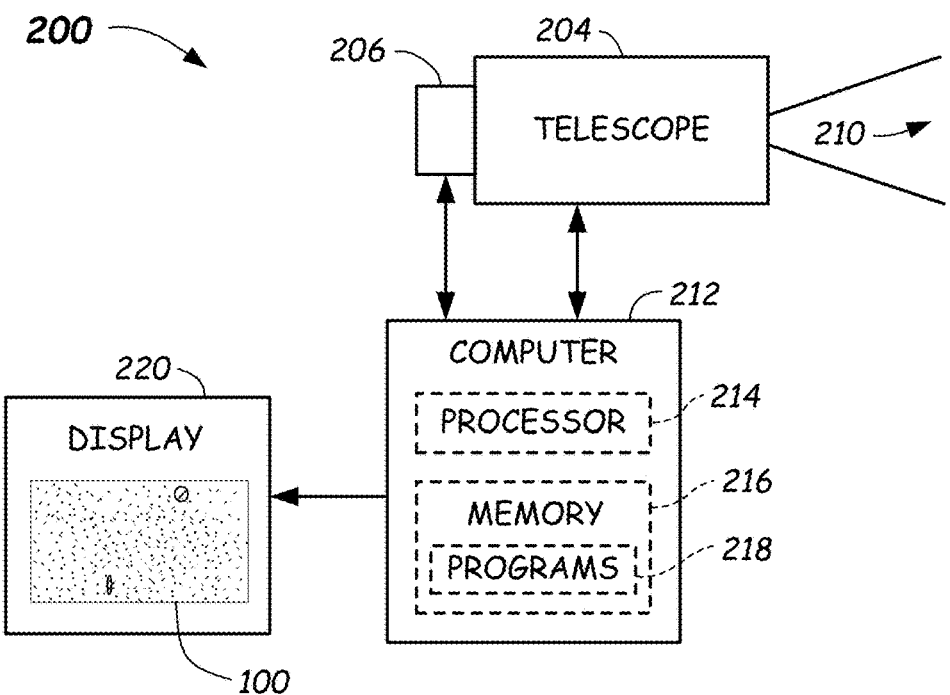
FIG. 2 illustrates a system configured to implement the methods and apparatus described herein to remove satellite trails from images according to one or more embodiments.

Additional reference is made to FIG. 2, which illustrates an embodiment of a system 200 configured to implement the methods and apparatus described herein. The system 200 includes a telescope 204 configured to focus images of celestial bodies onto an imaging device 206. The celestial bodies may include the celestial bodies 106 of FIG. 1. The telescope 204 focuses celestial bodies located in a field of view 210 onto the imaging device 206. When a satellite passes through the field of view 210 during periods that the imaging device 206 is capturing images, the satellite trail 104 may be imaged. The imaging device 206 may include the imaging components (e.g., pixels) described herein that convert the image focused thereon to image data. The imaging device 206 may be, as an example, a digital camera.

The system 200 may include a computer 212 that may be configured to perform the analysis and processing of image data described herein. Accordingly, the computer 212 may be configured to remove the satellite trail 104 as described herein. The computer 212 may include a processor 214 and a memory 216. The processor 214 may be configured to execute programs 218 stored in the memory 216. In some embodiments, the programs 218 may be executed by the Python programming language. In some embodiments, one or more of the programs 218 may be stored external to the computer 212.

The system 200 may also include a display 220 configured to display image data processed by the computer 212. For example, the display 220 may display the initial image 100 with the satellite trail 104 removed. In addition, the computer 212 may be configured to generate signals that cause the telescope 204 to focus certain celestial bodies onto the imaging device 206. For example, the signals may cause the telescope 204 to point at specific directions in the sky. The computer 212 may also be configured to receive image data generated by the imaging device 206 and process the image data as described herein.

Methods of removing the satellite trail 104 from the initial image 100 may commence with locating and removing the stars 108 from the initial image 100. The satellite trail 104 may be extremely dim relative to the surrounding star field (e.g., celestial bodies 106). Further, because the stars 108 are randomly distributed, the stars 108 often appear to be located along lines. As a result of these two factors, the total signal brightness along a line passing through several bright stars can often exceed the total signal brightness along the satellite trail 104. This makes it difficult to detect the satellite trail 104 instead of a line of the stars 108. Rather than attempting to detect the satellite trail 104 from within the star field, in some embodiments, the present approach removes the stars 108 and/or celestial bodies 106 and then detects the satellite trail 104.

A star removal algorithm, which may be one of the programs 218, first identifies the stars 108 and/or celestial bodies 106 in the initial image 100. The program may then iterate through each of the stars 108 and/or celestial bodies 106 and removes them. The star removal algorithm may use different methods of identifying the stars 108 and/or celestial bodies 106 in the initial image 100. In some embodiments, the identification may be performed by comparing the initial image 100 to known star locations. In some embodiments, the comparison may yield information as relative sizes of the stars. In some embodiments, the comparison may be performed external to the computer 212. In some embodiments, the comparison may compare the initial image 100 to a catalog of know locations of celestial bodies. For example, in some embodiments, platesolving may be used to identify the location and orientation of an image. A database of celestial objects, such as the Gaia database, may then be queried to determine which celestial objects are in the image and their location in the image. Astrometry.net provides platesolving tools, for example.

The star removal algorithm may then iterate through each of the identified celestial bodies 106. In some embodiments, the algorithm may first determine the radius of each celestial body. In some embodiments, the algorithm determines the diameters in pixels. To determine diameter, the algorithm may begin with a radius r=1 pixel and continually increments the radius by a predetermined number of pixels, such as one pixel. For each radial increment, the star removal algorithm selects a predetermined number of equally spaced points a distance of r from the center of the identified celestial body. In some embodiments, the number of predetermined equally spaced points is 50. These 50 points are defined by equation (1) as follows:

$$(x_k, y_k) = \left(x_c + r\cos\left(\frac{k\pi}{25}\right), y_c + r\sin\left(\frac{k\pi}{25}\right)\right), \quad \text{Equation (1)}$$

wherein $k = 0, 1, 2, \ldots 50$

The coordinates $(x_c, y_c)$ is the center of the celestial body. Other numbers of points may be used (e.g., fewer or more than 50 points). In some embodiments, the algorithm finds the closest lattice point to each $(x_k, y_k)$ coordinate pair and calculates the median brightness of the pixels corresponding to these lattice points. If the median brightness is greater than the median brightness of the entire image, the algorithm may conclude that r is smaller than the radius of the celestial body and continues to increment r. If, on the other hand, the median brightness of the 50 points is less than or equal to the median brightness of the entire image, the algorithm determines that the current radius marks the edge of the celestial body, and records that the celestial body has radius r.

Figure 3:
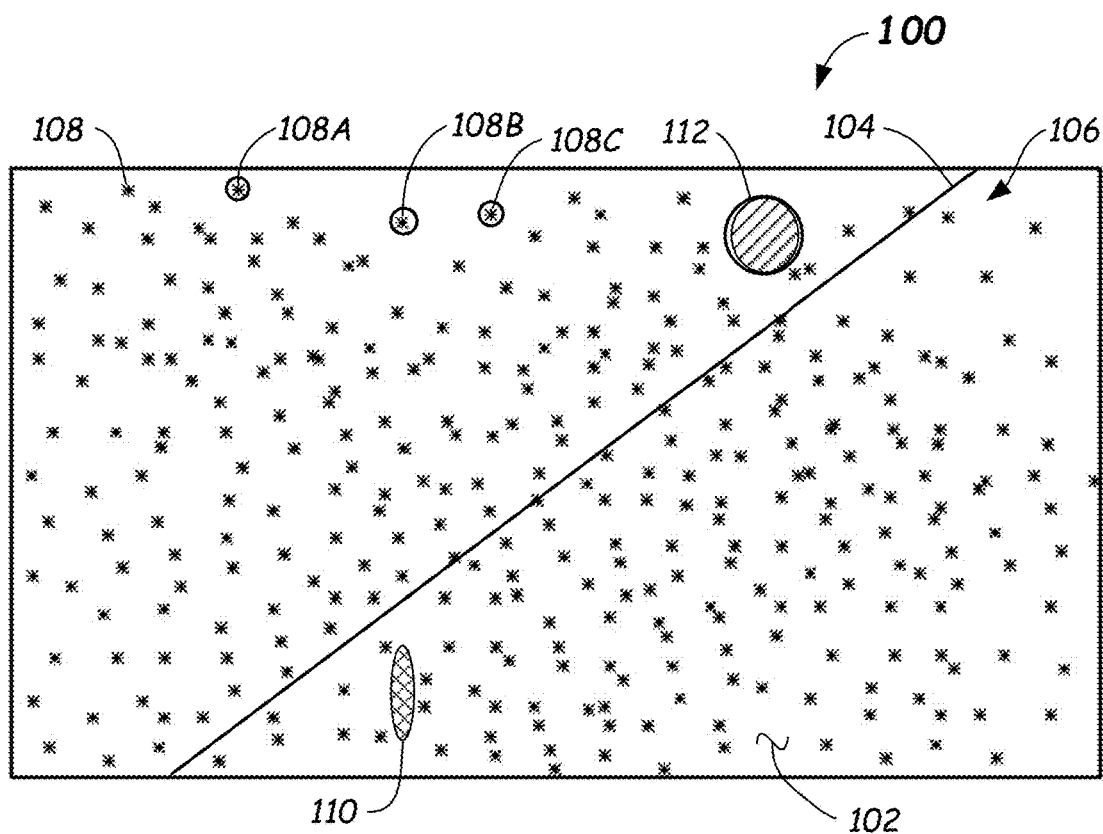
FIG. 3 illustrates the initial image of FIG. 1 where radii of celestial bodies have been determined and marked with circles according to one or more embodiments.

Additional reference is made to FIG. 3, which illustrates radii of certain ones of the celestial bodies 106 in the initial image 100 that have been determined using the algorithm. These celestial bodies are marked with circles. In many embodiments, the radii of a plurality or most of the celestial bodies 106 may be determined by the algorithm. In the embodiment of FIG. 3, circles surrounding a first star 108A, a second star 108B, a third star 108C, the galaxy 110, and the nebula 112 indicate the radii determined by the algorithm.

In some embodiments, after the algorithm has determined the radius of a star or other celestial body, the algorithm sets the brightness of a plurality or all the pixels that are a distance of less than r+1 from $(x_c, y_c)$ to the median brightness of nearby background pixels. This process may be repeated for each star or other celestial bodies identified in the initial image 100. In some embodiments, the median brightness of the image is used as an estimate of the background brightness of the image. In some embodiments, this is a reasonable assumption because the majority of pixels in most astronomical images are a part of the background. In some embodiments, the background brightness is based on a portion of the image that is devoid of celestial bodies.

Figure 4:
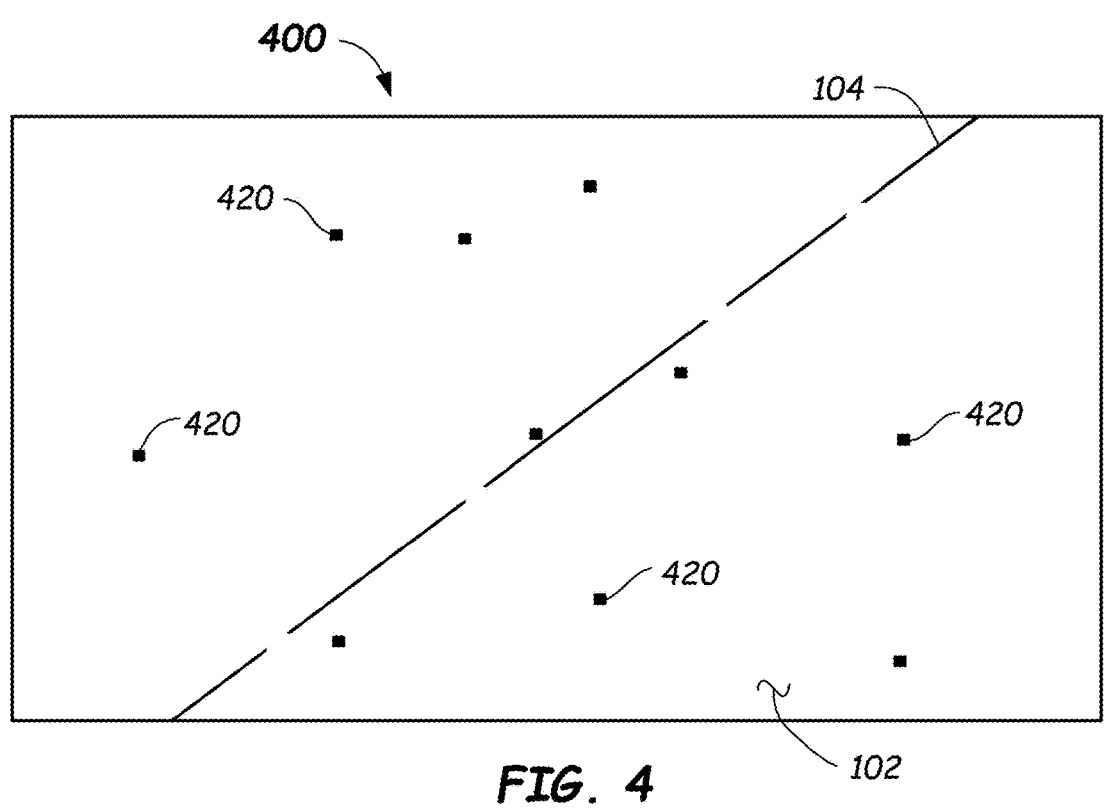
FIG. 4 illustrates the initial image of FIG. 1 with the celestial bodies removed and outlier pixels remaining in the image according to one or more embodiments.

Additional reference is made to FIG. 4, which illustrates an example resulting image 400 with the celestial bodies 106 removed. As shown in FIG. 4, the removal of some of the celestial bodies 106 may have removed portions of the satellite trail 104. At this state in the processing, an image 400 has been produced wherein the celestial bodies 106 have been removed. The star-removed image 400 includes the satellite trail 104 or portions of the satellite trail 104 and, in some embodiments, outlier pixels 420. In some embodiments, the image 400 is referred to as the star-removed image.

In some embodiments, the image 400 may include outlier pixels 420 (a few labelled), which are pixels that can outshine the satellite trail 104 in the same manner as bright star 108 or other ones of the celestial bodies 106. At least some of the outlier pixels 420 may be due to defective pixels in the imaging device 206 (FIG. 2). These defective pixels may generate image data indicative of a bright light irrespective of the light intensity incident on the pixels. Other ones of the outlier pixels 420 may be due to celestial bodies not identified in the initial image 100. Other ones of the outlier pixels 420 may be due to artifacts, such as due to defects in the telescope 204 (FIG. 2).

In some embodiments, an outlier removal algorithm may be used to remove the outlier pixels. The outlier removal algorithm may set the values of the outlier pixels to values where the outlier pixels do not interfere with detection of the satellite trail 104. The outlier removal algorithm may be one or more of the programs 218 (FIG. 2) and may be resident in the memory 216. In other embodiments, the outlier removal algorithm may be located external to the computer 212 (FIG. 2).

In some embodiments, the outlier removal algorithm may include two stages of outlier detection. A first stage may detect outlier pixel candidates and a second stage may remove the outlier pixels. The first stage may find outlier pixel candidates by determining the number of standard deviations each pixel is from the mean pixel brightness of the image 400. If this brightness difference is greater than a predetermined value, then the pixel may be marked as an outlier pixel candidate. In some embodiments, if the brightness difference is greater than 4 standard deviations, the pixel may be marked as an outlier pixel candidate. Other numbers of standard deviations may be used. All the outlier pixels 420 in FIG. 4 may be identified as outlier pixel candidates. In some embodiments, the satellite trail 104 may be bright compared to the mean pixel brightness and marked as an outlier pixel candidate. Accordingly, the satellite trail 104 may be removed if only the first outlier detection stage is employed. To remedy this, the outlier pixel candidates found in the first stage may processed by a second stage.

The second stage of the outlier detection algorithm may determine which of the outlier pixel candidates are truly outlier pixels. In some embodiments, the outlier detection algorithm does so by comparing each outlier pixel candidate to only those pixels in the immediate vicinity of the outlier pixel candidate as opposed to all pixels. In some embodiments, the outlier detection algorithm may select a grid of a predetermined size, wherein the outlier pixel candidate is centered in the grid. The algorithm may compute the average pixel brightness of the grid. In some embodiments, the outlier detection algorithm my also compute the standard deviation of the grid. In some embodiments, for each outlier pixel candidate, the second stage selects a 5 by 5 grid of pixels (including the outlier pixel candidate at the center of the grid) and computes the average pixel brightness of this grid, in addition to standard deviation of the grid.

The brightness of the outlier pixel candidate may then be compared to the average pixel brightness of the grid to determine whether the outlier pixel candidate is actually an outlier pixel. In some embodiments, if the brightness of the outlier pixel candidate is more than three standard deviations from the average pixel brightness of the grid, the outlier pixel candidate is determined to be a true outlier pixel. The threshold for the second stage for determining whether the outlier pixel candidate is actually an outlier pixel may be lower than that of the previous stage because normal pixels should be close in brightness to their surrounding pixels, but not necessarily close to the mean brightness of the entire image (e.g., the grid). For example, a pixel in a satellite trail may be much brighter than the mean brightness of the image but not significantly brighter than neighboring pixels along the satellite trail. On the other hand, if the same pixel is much brighter than its neighboring pixels, then it is likely an outlier. Other grid sizes and/or numbers of standard deviations may be used.

In response to locating the actual outlier pixels from the outlier pixel candidates, the actual outlier pixels may be removed. The removal may include setting the values of the outlier pixels to the median values of nearby pixels. The removal procedure may be identical or substantially similar to the process or removing the celestial bodies 106 (FIG. 1) from the initial image 100. Additional reference is made to FIG. 5, which illustrates an image 500, which is the initial image 100 (FIG. 1) with both the celestial bodies 106 (FIG. 1) and the outlier pixels 420 (FIG. 4) removed.

In the second segment of the program, the image 500 with no celestial bodies or outlier pixels may be processed by a trail detection algorithm, which detects the satellite trail 104 in the image 500. The trail detection algorithm may be one of the programs 218 executed by the processor 214. In other embodiments, the trail detection algorithm may be located and/or executed on an external computer. The trail detection algorithm takes advantage of the unique characteristic of satellite trails in that satellite trails typically traverse a large portion of an image. This characteristic of satellite trails means that although a satellite trail may not be as bright as other objects in the image 100, the mean brightness along the path of the satellite trail is likely to be greater than the mean brightness along any other line through the image 100 after the celestial bodies 106 and the outlier pixels 420 have been removed to generate the image 500.

Based on the characteristics of a satellite trail, the trail detection algorithm may process the image 500 using three processes. In the first process, the algorithm may iterate through each possible line through the image 500 by selecting two points that are referred to as an "entrance point" and an "exit point" for the line. Possible entrance and exit points can be specified as either each edge pixel or as evenly spaced edge points which fall between pixels. Each combination of entrance point and exit point is processed by the second process described below.

The second process computes or otherwise determines the mean and median brightness for each line corresponding to a combination of entrance and exit points. If the slope of a line is less than or equal to 1, the algorithm takes pixel-size steps in the x-direction along the line. If the slope is greater than 1, the algorithm takes pixel-size steps in the y-direction along the line. The algorithm may then average the brightness of pixel steps along the line to determine the mean and median line brightness. The algorithm then sums the mean and median. The third process selects the line with the greatest sum of mean and median brightness as the satellite trail 104.

The median brightness term is an extra precaution for outlier pixels and bright celestial bodies that were by chance not removed. A line passing through two stars or outlier pixels would have a very low median brightness, making median brightness a good differentiator between true satellite trails and combinations of bright areas. In some embodiments, interpolation may be employed to determine the lines. When taking pixel size steps along a line, the algorithm often does not arrive at a pixel, but instead at a point between pixels. Linear interpolation may be employed between pixels to overcome this problem. However, the Gaussian distribution of a satellite trail is not accurately approximated through linear interpolation. In particular, if the peak of a Gaussian distribution is between two pixels, linear interpolation will suggest that the peak is at one of the two pixels.

Figure 6:
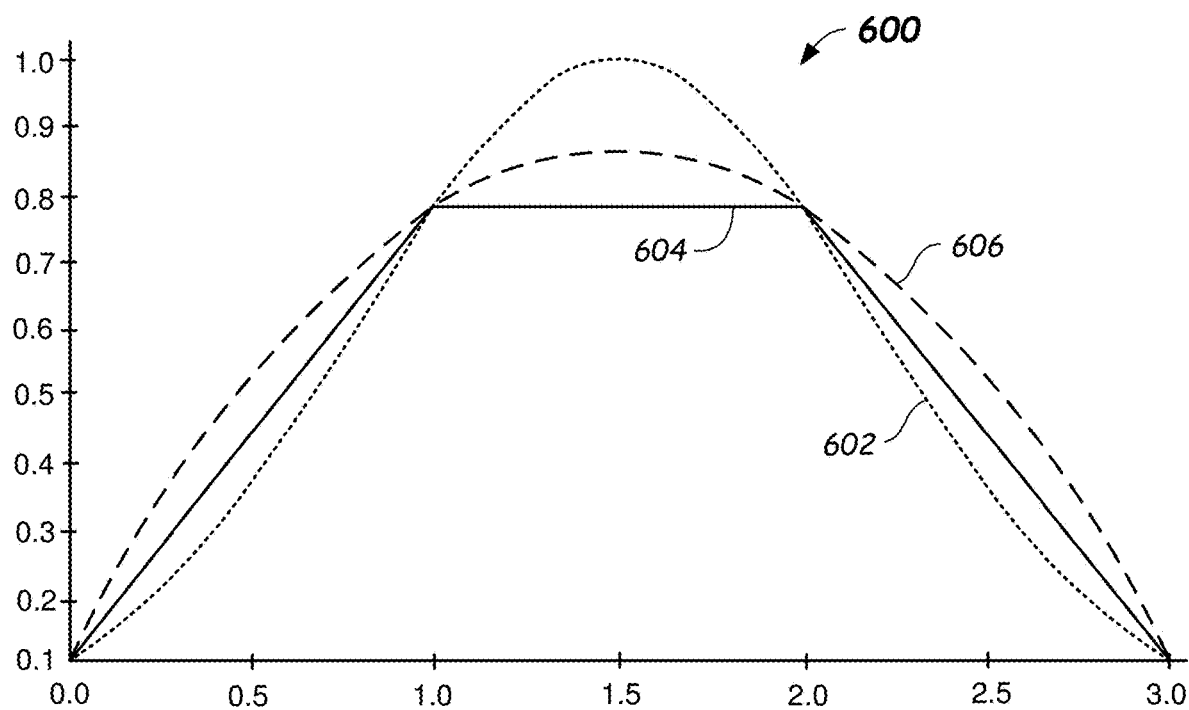
FIG. 6 is a graph showing a Gaussian function modeled through linear interpolation and cubic interpolation according to one or more embodiments.

Additional reference is made to FIG. 6, which illustrates a graph 600 showing a Gaussian distribution 602 modeled through linear interpolation 604 and cubic interpolation 606. The cubic interpolation 606 better approximates the shape and maximum location of the Gaussian distribution 602. Using linear interpolation can lead the identified line to be biased toward lattice (pixel) points. To fix this issue, the program may more accurately determine the brightness of non-lattice points using cubic interpolation 606 as shown in FIG. 6.

The cubic interpolation may be performed as described below. In some embodiments, the program may include a PiecewiseCubic class to hold all interpolation. The PiecewiseCubic class may include an _init_ function that iterates through all possible 4×4 squares of pixels. Each pixel may be assigned coordinates (x, y) with $0 \le x \le 3$ and $0 \le y \le 3$. The pixels in each square may be used to find the bivariate polynomial as follows:

$$p(x,y) = c_1 + c_2 x + c_3 y + c_4 x^2 + c_5 y^2 + c_6 xy + c_7 x^3 + c_8 y^3 + c_9 xy^2 + c_{10} x^2 y + c_{11} x^2 y^2 + c_{12} x^3 y + c_{13} xy^3 + c_{14} x^3 y^2 + c_{15} x^2 y^3 + c_{16} x^3 y^3$$

Equation (2)

Equation (2) exactly fits the brightness of the pixels in the square. This polynomial may be found using a "numpy.linalg.solve" function. Other algorithms may be used to find the polynomial. The _init_ function may end by storing all of these polynomials in a list, such as a 2D list. Other numbers of pixel squares may be used. After the program creates a PiecewiseCubic, the program can call the call function (_call_function) of that object with points to interpolate. The call function may first determine which polynomial to employ. The call function may select the polynomial corresponding to the 4×4 square of pixels that is most nearly centered on the desired point. Finally, the desired point coordinates are substituted into the polynomial and the result is returned.

The satellite trail detection algorithm described above may be time consuming when applied to large images, such as images having more than 1,000,000 pixels, which is much smaller than most images. For such an image, $6\times1000^2=6\times10^6$ lines may be examined. Assuming that, on average, the program examines 500 points per line, in total, the brightness of $500\times6\times10^6=3\times10^9$ points are computed. Each point requires evaluating a two-dimensional cubic. Examining all lines can take several hours on a standard processor.

To improve the processing speed, in some embodiments, the program employs recursive scaling. If an image includes more than a predetermined number of pixels, the image may be scaled down by a predetermined factor on each side. For example, in some embodiments, if the image is greater than 90,000 pixels, the image may be scaled down by a factor of 4 on each side. If the resultant image is still too large, the program may scale down the original image by a greater factor, such as a factor of 16, on each side. The program continues in this manner, scaling down sequentially by powers of 4, until the resultant image is less than 90,000 pixels. Other scaling factors may be used.

The algorithm may then find the satellite trail in the reduced-size image using the satellite trail detection algorithm described above. Next, the algorithm may scale the determined endpoints so that they correspond to the second smallest image. The algorithm may then check all lines near the scaled-up satellite trail from the previous image. The mean brightness of all possible lines are compared against each other (the median brightness is no longer needed to ensure that the trail is found). This rescaling process may be repeated until the satellite trail 104 is identified in the image 500.

In some situations, a bright celestial body (e.g., a bright star) or an outlier pixel may be located near the corner of an image. In such situations, a line passing through or near the corner of the image may appear to be a satellite trail because that celestial body or outlier pixel may create a high mean brightness for a line passing through it. In order to overcome this anomaly, in some embodiments, the program does not allow lines which are less than or equal to a predetermined number of pixel steps in length. For example, the program may not consider lines that are less that 40 pixel steps in length in some embodiments. Other lengths may be used.

In the third segment of the program, once a satellite trail has been detected in the image 500, the program returns to the initial image 100 with the celestial bodies 106 and may determine several properties of the satellite trail 104. As described above, the brightness of a satellite trail is normally distributed as a function of the perpendicular distance to the satellite trail with a standard deviation that does not change significantly along the length of the satellite trail. The brightness as a function of distance along the satellite trail can vary and may be modeled by a polynomial $b(d_\parallel)$. Thus, the photon count, $c(d_\parallel, d_\perp)$, at a point can be expressed by equation (3) as:

$$c(d_\parallel, d_\perp) = b(d_\parallel)e^{-d_\perp^2/(2\sigma^2)} \quad \text{Equation (3)}$$

where $d_\parallel$ is the distance parallel to the satellite trail, $d_\perp$ is the distance perpendicular to the satellite trail, and $\sigma$ is the standard deviation of the normal distribution. In some circumstances, the satellite trail 104 can wobble around a central line of the satellite trail 104. This wobble can be fit by a function f computed using Fast Fourier Transforms (FFTs) and can be factored into the transformation from x, y coordinates to $d_\parallel$ and $d_\perp$.

In some embodiments, fitting a Gaussian function to the detected satellite trail 104 may include three modules and four basic steps. The modules may include:

1. A curvilinear transformation module for trail wobble and slant.
2. A Fast Fourier Transform (FFT) module to compute a fit for the trail wobble as a sum of sines and cosines.
3. A module with a set of functions to ignore pixels near identified stars or celestial bodies and to interpolate the desired pixel values of data near these ignored pixels. Additionally, the piecewise cubic discussed above may be used in the third program segment.

The four basic steps may include:
1. Compute and fit a function to the satellite trail wobble.
2. Compute a more accurate value for the image background near the satellite trail.
3. Compute and fit a polynomial to the satellite trail brightness.
4. Compute the standard deviation of the satellite trail.

Each of these modules and steps is described in greater detail below. A satellite trail can pass through an image in any orientation and can wobble around a central line of the satellite trail. This means the light from a satellite trail may be approximated by a complex Gaussian-type distribution. To simplify the fit, in some embodiments, the program first determines the orientation and wobble of the satellite trail and then applies a curvilinear coordinate transformation to convert (x, y) pixel coordinates to the coordinates $d_\parallel$ and $d_\perp$. These new coordinates represent the distances from the y-intercept of the satellite trail to a point in directions parallel to and perpendicular to the satellite trail, respectively. This coordinate transformation allows the path of the satellite trail to be described by the simple formula $d_\perp=0$, which makes subsequent Gaussian fitting significantly easier.

The coordinate transformation first assumes that the satellite trail has no wobble and can be approximated by a straight line passing through the image. Given a line of the form y=mx+b, the transformation to determine $d_\parallel$ and $d_\perp$ is provided by equation (4) and equation (5) as follows:

$$d_\parallel = \frac{x + my - mb}{\sqrt{1+m^2}} \quad \text{Equation (4)}$$

$$d_\perp = \frac{y - mx - b}{\sqrt{1+m^2}} \quad \text{Equation (5)}$$

However, if the line is vertical, m=∞, which means that the program cannot use the equations (4) and (5) for vertical lines (without taking limits). If a vertical line is given by $x=x_0$, the coordinates are given by $d_\parallel=y$ and $d_\perp=x-x_0$.

The following description is based on the satellite trail wobbling around a central line. The location of the satellite trail is not given by the equation $d_\perp=0$ as it would if the trail were a straight line. Rather, the wobbling satellite trail is determined by the equation $d_\perp=f(d_\parallel)$ for a function f that represents the satellite trail wobble. This function however defeats the purpose of having the satellite trail be along $d_\perp=0$. To remedy this issue, the program may subtract $f(d_\parallel)$ from the expression for $d_\perp$. For a non-vertical line, the satellite trail is provided by equations (6) and (7) as follows:

$$d_\parallel = \frac{x + my - mb}{\sqrt{1+m^2}} \quad \text{Equation (6)}$$

$$d_\perp = \frac{y - mx - b}{\sqrt{1+m^2}} - f(d_\parallel) = \frac{y - mx - b}{\sqrt{1+m^2}} - f\left(\frac{x + my - mb}{\sqrt{1+m^2}}\right) \quad \text{Equation (7)}$$

and for a vertical line, the satellite trail is provided by equations (8) and (9) as follows:

$$d_\parallel = y \quad \text{Equation (8)}$$

$$d_\perp = x - x_0 - f(d_\parallel) = x - x_0 - f(y) \quad \text{Equation (9)}$$

This new curvilinear transformation of equations (6)-(10) satisfies the desired condition that the curve $d_\perp=0$ represents the path of the wobbling satellite trail. The inverse transformation, which converts $d_\parallel$ and $d_\perp$ to x and y coordinates is given by equations (10) and (11) as follows:

$$x = \frac{d_\parallel - m(d_\perp + f(d_\parallel))}{\sqrt{1+m^2}} \quad \text{Equation (10)}$$

$$y = \frac{md_\parallel + d_\perp + f(d_\parallel)}{\sqrt{1+m^2}} + b. \quad \text{Equation (11)}$$

In the process of determining a two-dimensional Gaussian fit for the satellite trail, particularly while fitting wobble and satellite trail brightness, the program may fit a function to data of an unknown form. Furthermore, the satellite trail wobble may oscillate rapidly and unpredictably, making it unsuited for a polynomial fit. In addition, because of the noise inherent in images, a standard Fourier transform, which fits data exactly with no smoothing, also may not be appropriate for the task. As a result, in some embodiments, the program employs a variation on a Fourier transform which strategically discards frequencies in order to smooth the fit without losing valuable data.

The program may include a modified Fourier transform module that first performs a Fast Fourier Transform (FFT). Various FFT modules may be used that return frequencies and amplitudes. Then, using the returned frequencies and amplitudes, the modified FFT module may synthesize a function that fits the given data exactly. Next, to remove negligible terms, the modified FFT module may remove all terms involving a sine or cosine with amplitude less than a predetermined value (e.g., 0.0000001).

In order to smooth the exact fit, the modified FFT module may weigh each term with and amplitude A and a frequency f according to the equation (12) as follows:

$$w = \frac{A}{f + 0.00001} \quad \text{Equation (12)}$$

The modified FFT module may then remove a user selected number of terms with the smallest weights. The weighting balances two factors. First, terms with small amplitudes are often either unimportant for the overall fit or only relevant when combined with a number of other small amplitude terms to create abrupt changes in the data. Neither of these contributions is beneficial to a smooth fit. Second, terms with high frequency are often used to exactly fit noise and so are undesirable for a smooth fit. The 0.00001 term in the denominator of equation (12) is simply to avoid division by zero errors which occur with the constant term in the synthesized fit, which is represented as a cosine function with frequency 0.

During the several fitting procedures used to create a Gaussian brightness profile for the satellite trail 104 (FIG. 1), the celestial bodies 106 (FIG. 1) and/or outlier pixels 420 (FIG. 4) can interfere with the brightness fits because they often outshine the satellite trail 104. To remedy this, in some embodiments, the program uses a function that detects which points (e.g., pixels) are influenced by nearby celestial bodies and/or nearby outlier pixels. This function may use the list of celestial bodies 106 in the initial image 100. For each celestial body and each point in question, the function may determine if the point is located within a user specified minimum distance from the edge of the celestial body. Similarly, the program may determine which points are located within a minimum distance of any detected outlier pixels. If a point is too close to a celestial body or an outlier pixel, the function may mark the point false in a separate array.

In some embodiments, some of the satellite trail fitting functions may examine points outside of the initial image 100 (FIG. 1). In some embodiments, the function may also mark any points outside of the initial image 100 as false as well. The function may then generate a list of which points are affected by celestial bodies and/or outlier pixels or that are outside the initial image 100.

Figure 7A:
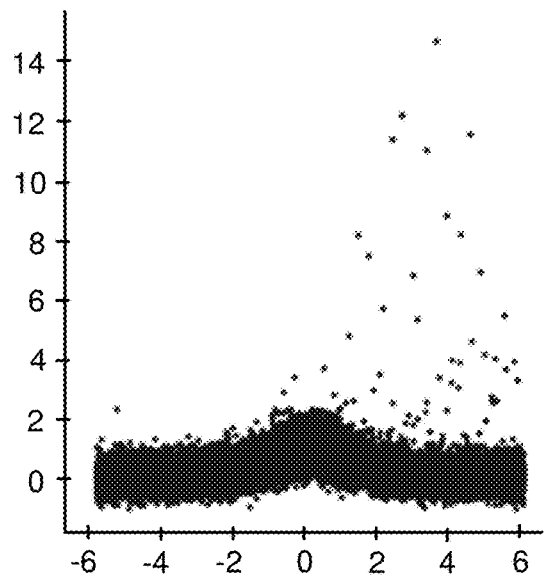
FIG. 7A illustrates example pixel values (brightness) of a satellite trail before points near celestial bodies and/or outlier pixels have been removed according to one or more embodiments.
Figure 7B:
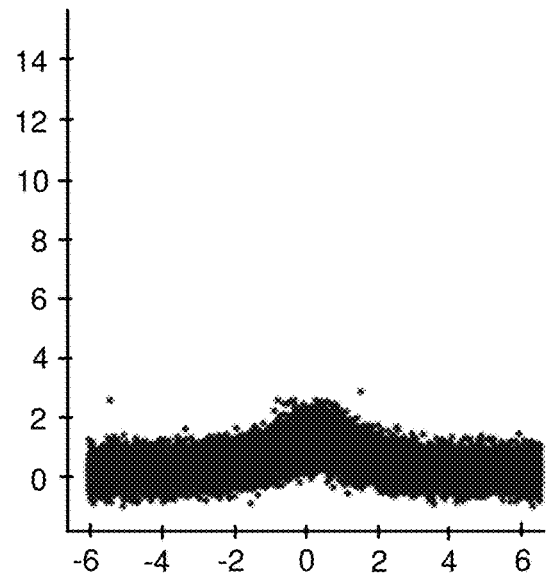
FIG. 7B illustrates example pixel values (brightness) of the satellite trail of FIG. 7A after points near celestial bodies and/or outlier pixels have been removed according to one or more embodiments.

For some purposes, such as fitting a Gaussian function, the affected pixels can be removed. However, a FFT requires that its input be evenly spaced data. To remove the effects of celestial bodies and/or outlier pixels while keeping data evenly spaced, the program may use a second function (e.g., interpolateSignal) to linearly interpolate between the unaffected values on both sides of a region with a celestial body and/or an outlier pixel. Additional reference is made to FIGS. 7A and 7B. FIG. 7A illustrates example satellite trail values before points near celestial bodies and/or outlier pixels are removed. FIG. 7B illustrates the satellite trail values of FIG. 7A after points near celestial bodies and/or outlier pixels are removed (e.g., ignored). Thus FIG. 7B shows the significant noise reduction that occurs as a result of detecting and ignoring points near celestial bodies and/or outlier pixels.

Some embodiments, of the method of fitting the trail wobble may examine equally spaced steps along the identified satellite trail. The number of steps may be determined by the number of pixels in the larger edge of the initial image 100 (FIG. 1). At each step, the method may use an algorithm, discussed below, to determine at what distance from the central line the center of the satellite trail lies. Once this distance has been determined, the method may invoke the previously described function to remove data points influenced by celestial bodies and outlier pixels and to interpolate between points. Finally, the modified FFT module may determine a fit for the wobble function $f(d_\parallel)$ of the satellite trail.

The method of determining the location of a satellite trail in each step is used to fit satellite trail wobble. Two approaches were described above. In a first approach, the method examines points perpendicular to the satellite trail 104. As discussed above, the program may process equally spaced steps along the satellite trail 104. At each step, given by equally spaced values of $d_\parallel$, this method examines points with varying $d_\perp$. In particular, the method examines the points given by equation (13) as follows:

$$d_\perp = d_{step} i - d_{bound} \qquad \text{Equation (13)}$$

$$\text{wherein } 0 \le i \le \frac{2 d_{bound}}{d_{step}}$$

In other words, equally spaced points between $-d_{bound}$ and $d_{bound}$, are separated by a distance $d_{step}$. The user may pick $d_{bound}$ and $d_{step}$, but the default values may be set, such as 5 and 0.1, respectively. The method may then select the brightest point as the location of the satellite trail, and use $(d_\parallel, d_\perp)$ as a data point for the curve fitting described herein. In some embodiments, the inherent noise in images may make the estimated position of the satellite trail at each step noisy. As a result, the approach may rely heavily on the ability of the modified FFT to smooth the noise as described herein.

A second method of determining the location of a satellite trail at each step may be more robust. Instead of processing the brightest pixel, the method may first compute a Gaussian cross-correlation integral and then pick the point with the highest cross-correlation. This method examines the same points as the previous approach. However, this method examines the points differently. The method first computes a Gaussian distribution with peak 1 and standard deviation set by the user as shown in equation (14). In the embodiment of equation (14), a default is set to 2.

$$g(x) = e^{-x^2/2\sigma^2} \qquad \text{Equation (14)}$$

wherein:

$$x = d_{step} j - x_{range} \text{ and } 0 \le j \le \frac{2 x_{range}}{d_{step}}$$

wherein $x_{range}$, chosen by the user (default set to 2), marks the range of x values at which the Gaussian function is evaluated. Next, for each $d_\perp$, the method evaluates a correlation by equation (15) as follows:

$$\text{corr}(d_\perp) = \qquad \text{Equation (15)}$$

$$\sum_{j=0}^{\frac{2 x_{range}}{d_{step}}} [b(d_\parallel, d_\perp - x_{range} + d_{step} j) \cdot g(d_{step} j - x_{range})]$$

Equation (15) numerically approximates the cross-correlation integral of the satellite trail brightness and g(x). Finally, for each $d_\parallel$, the method selects the $d_\perp$ with the highest cross-correlation.

Figure 8:
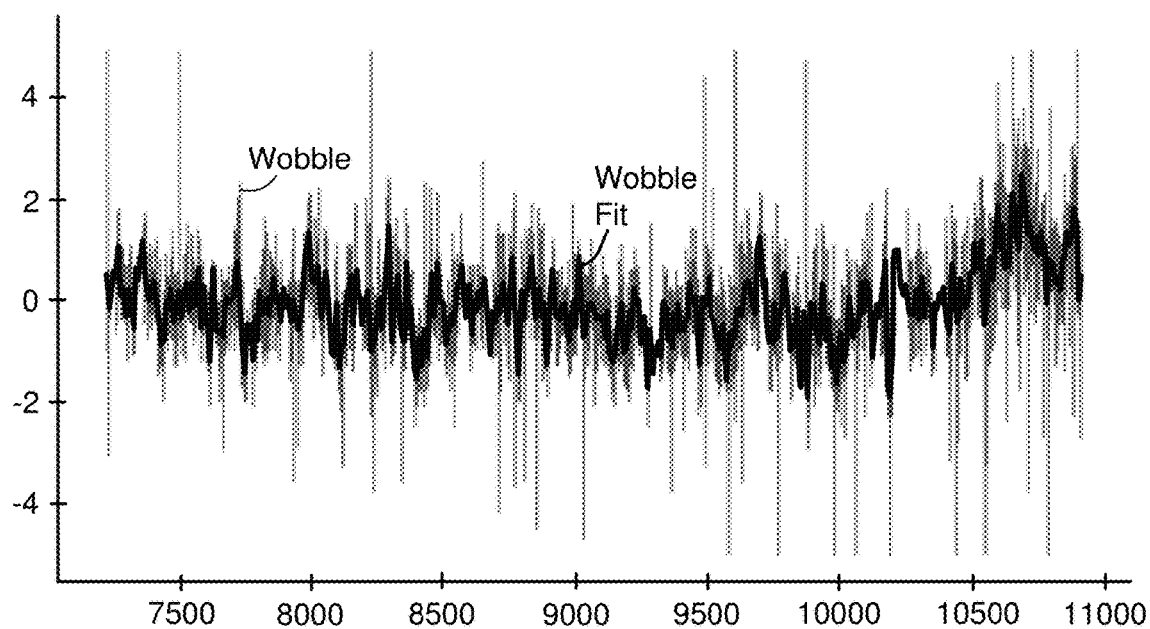
FIG. 8 is a graph illustrating a computed wobble and wobble fit for a satellite trail, such as the satellite trail in the initial image of FIG. 1, according to one or more embodiments.
Figure 9:
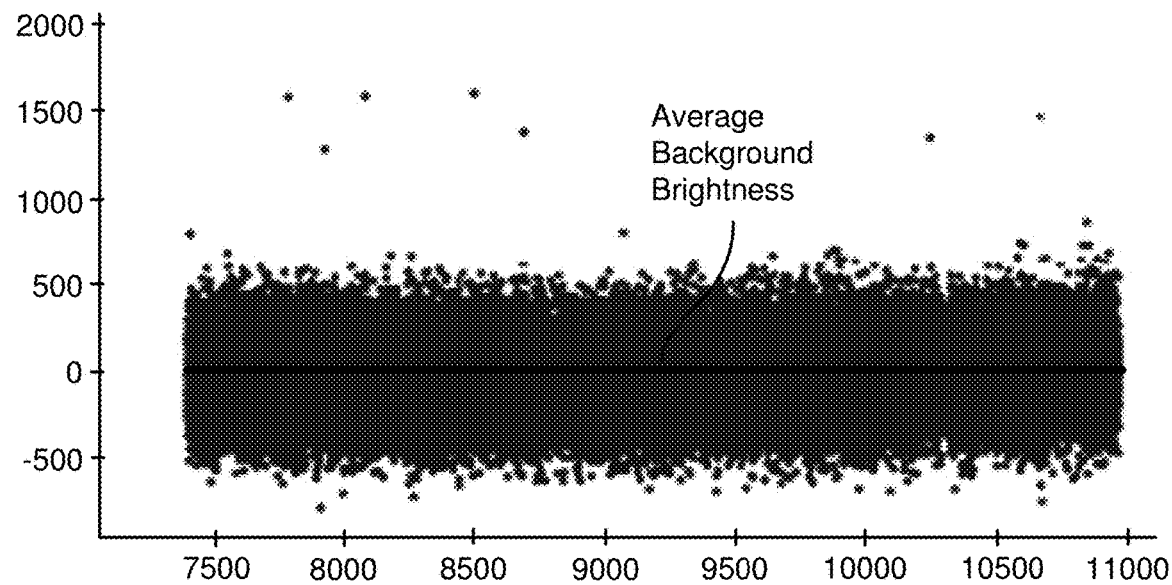
FIG. 9 is a graph illustrating a computed background brightness and mean background brightness of the initial image according to one or more embodiments.
Figure 10:
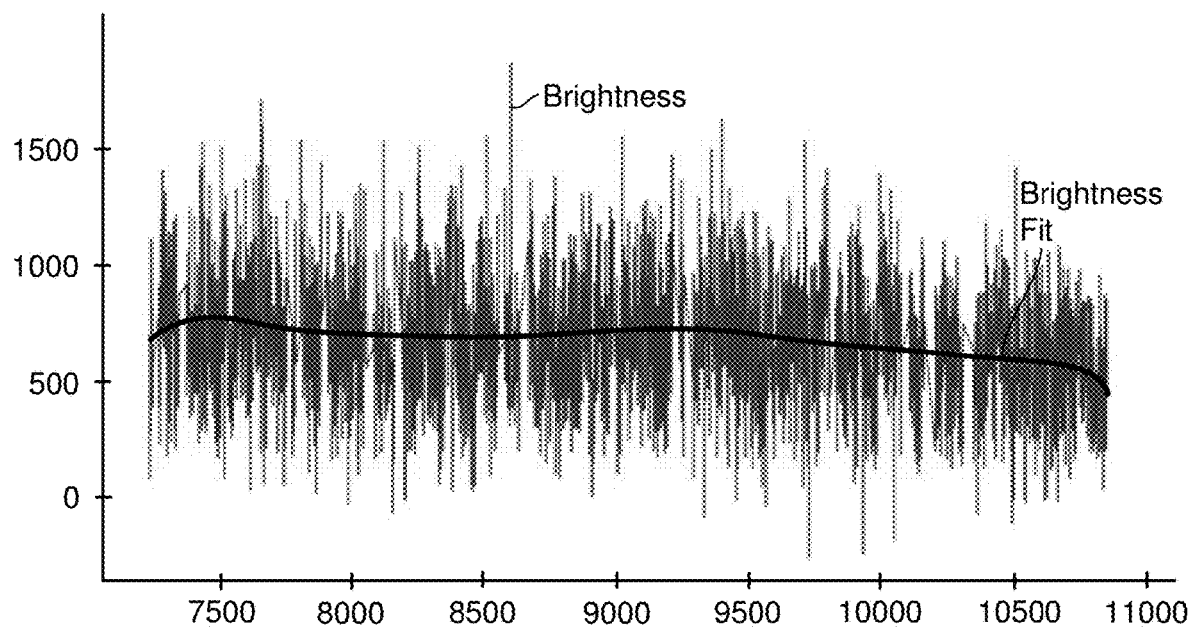
FIG. 10 is a graph illustrating a computed satellite trail brightness and a brightness fit for an image according to one or more embodiments.
Figure 11:
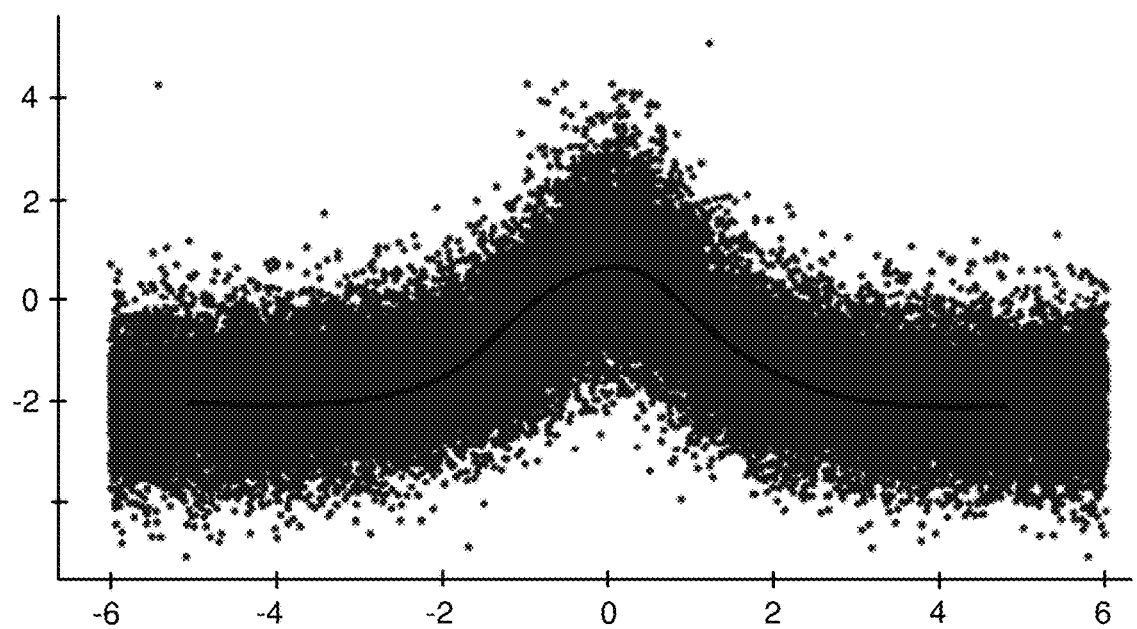
FIG. 11 is a graph showing satellite trail pixels (brightness) and a Gaussian fit for a for the satellite trail pixels according to one or more embodiments.

Additional reference is made to FIG. 8, which is a graph illustrating the computed wobble and wobble fit for a satellite trail, such as the satellite trail 104 (FIG. 1) in the initial image 100. FIG. 8 shows the determined wobble of the satellite trail 104 in the initial image 100 and the corresponding fit computed using Fourier synthesis. As shown, the original wobble is much noisier than the fit using the Fourier synthesis.

The background approximation employed in previous processes or steps may be too inaccurate to be used to accurately determine satellite trail brightness. As a result, in some embodiments, after fitting trail wobble, the programs (e.g., programs 218—FIG. 2) and/or methods more accurately fit the image background. To do so, the methods may perform a curvilinear transformation on all pixels in the initial image 100 and then may choose points with $10 \le d_\perp \le 20$, for example. Other value ranges may be used. Next, the method may remove the pixels that are within a predetermined range of the celestial bodies 106 and/or outlier pixels 420 (FIG. 4). The method may then average the brightness of all of these pixels to determine a more accurate value for the image background. Additional reference is made to FIG. 9, which illustrates an example of identified background pixels and average background for a sample image, such as the image 100.

The method may then determine a function that approximates the peak brightness of the satellite trail 104. To do so, the method may perform an inverse transformation on the curve defined by $d_\perp = 0$ to determine the points directly on the satellite trail 104. The method may then take as many equally spaced steps along the satellite trail 104 as there are pixels in the larger edge of the image. Then, at each step, the method may measure the brightness and store the brightness and $d_\parallel$ as a data point. Finally, the method may identify and interpolate over points that are affected by celestial bodies and/or outlier pixels and fit a polynomial, $b(d_\parallel)$, to the brightness. In some embodiments, the polynomial may be a fifth order polynomial. Additional reference is made to FIG. 10, which is a graph illustrating a computed trail brightness and brightness fit for an image, such as the initial image 100. In some embodiments, a Gaussian cross-correlation approach similar to that for fitting the trail wobble may be used to reduce noise.

After brightness fitting, the method may determine the standard deviation of the satellite trail 104. In some embodiments, the method may perform a curvilinear transformation on all pixels in the initial image 100, and then choose only the points less than a predetermined $d_\perp$, such as $d_\perp \le 5$, for example. Other values for $d_\perp$ maybe be used. Next, the method may remove the pixels which are too close to celestial bodies 106 and outlier pixels 420. Then, the method may divide each pixel brightness by $b(d_\parallel)$, which is the fitted polynomial brightness determined above. Finally, the method fits a Gaussian distribution in $d_\perp$ with peak height of 1.0 to the pixels and determines the fitted value of $\sigma$. Additional reference is made to FIG. 11, which is a graph showing the determined trail pixels and Gaussian fit for a sample image, such as the initial image 100.

Finally, in the fourth segment of the program, after fitting the satellite trail wobble $f(d_\parallel)$, the satellite trail brightness $b(d_\parallel)$, and the satellite trail standard deviation $\sigma$, the program may coordinate transform each pixel in the image using wobble function $f(d_\parallel)$. The program may then compute the brightness of the satellite trail 104 at each pixel according to equation (16) as follows:

$$c(d_\parallel, d_\perp) = b(d_\parallel) e^{-\frac{d_\perp^2}{2\sigma^2}} \qquad \text{Equation (16)}$$

Finally, the method may then subtract the calculated brightness pixelwise from the initial image 100. Additional reference is made to FIG. 12, which illustrates an image 1200, which is the initial image 100 (FIG. 1) with the satellite trail 104 removed.

In some embodiments, the preservation of photometry after the satellite trail 104 is removed may be determined. In some embodiments, testing photometry may include examining two images of the same region of the night sky 102. A first image (e.g., the initial image 100—FIG. 1) is an image with the satellite trail 104 and a second image does not include the satellite trail 104. For example, the second image may have been captured when the satellite trail 104 was not in the field of view of the second image. The satellite trail removal methods described herein may be applied to the first image to generate a third image (e.g., the image 1200—FIG. 12). Next, the photometry of stars near the satellite trail in all three images is determined and compared using aperture photometry, for example.

To compare the three images discussed above, the percent photometry error between the first image (e.g., the initial image 100) with the satellite trail 104 and the second image without the satellite trail may be determined for a plurality of the celestial bodies 106. Similarly, the percent of photometry error between the third image with the satellite trail 104 removed and the second image without the satellite trail may be determined. Additional reference is made to FIG. 13, which is a graph showing example comparisons between the two photometry errors.

Figure 13:
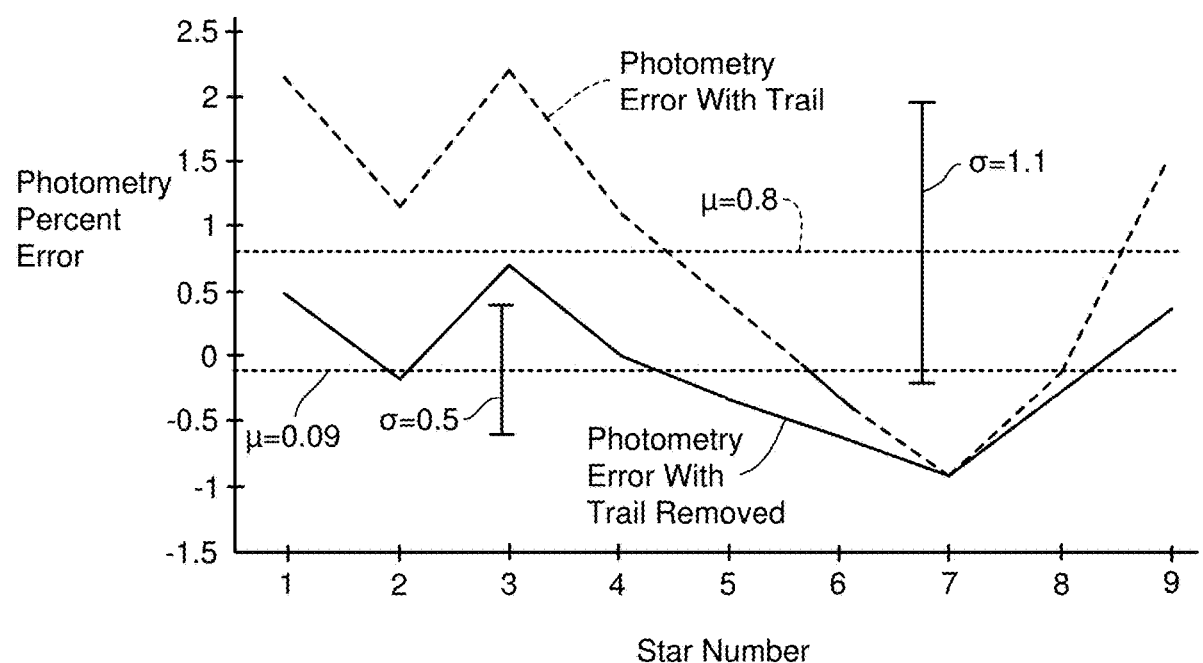
FIG. 13 is a graph illustrating a percent photometry error for both an image with a satellite trail and the same image with the satellite trail removed according to one or more embodiments.

As shown in the example embodiment of FIG. 13, the mean percent error is 9 times less for the third image (e.g., image 1200) with the satellite trail 104 removed than for the first image (e.g., the initial image 100) with the satellite trail 104. The mean percent error shows that the methods significantly reduce photometric error caused by satellite trails (e.g., satellite trail 104). Similarly, the standard deviation of the percent error is 2 times smaller for the third image (e.g., image 1200) with the satellite trail removed than for the first image (e.g., initial image 100) with the satellite trail 104 present.

In some embodiments, it may be possible to gain a rough estimate of the intrinsic photometric error based on the data in FIG. 13. In the example embodiment of FIG. 13, the $7^{th}$ star provides the same photometric percent error for both the first image (e.g., initial image 100) with the satellite trail 104 and the third image (e.g., image 1200) with the satellite trail 104 removed. This means that the $7^{th}$ star is far enough away from the satellite trail 104 to have its photometry unaffected by the satellite trail 104. Thus, the photometric percent error for the $7^{th}$ star is likely caused by intrinsic measurement error. The percent error of the $7^{th}$ star is approximately 0.9 and is thus an estimate of the intrinsic photometric error in the images. Significantly, the photometric percent error for all of the celestial bodies 106 in the image 1200 in which the satellite trail 104 was removed is 0.9% or less. This provides evidence that the satellite trail removal algorithm reduces photometric error to within the bounds of intrinsic photometric error.

In some embodiments, the methods may fit the satellite trail standard deviation and the methods to remove the satellite trail may be modified to use an integrated Gaussian function, instead of a standard Gaussian function. This method may be a more realistic fit, because the satellite trail is Gaussian function at the sub-pixel level.

In some embodiments, the methods used to remove stars and outlier pixels may be applied to galaxies. While removing circular portions of an image works well for stars, the methods may be less optimal for galaxies. Galaxies are rarely face-on and circular; instead they appear elliptical as illustrated by the galaxy 110 of FIG. 1. Functionality may be added to the star removal programs, which specifically search for known galaxies in the initial image 100 and remove the galaxies using ellipses, which may further improve the ability of the programs to find satellite trails.

In some embodiments, methods that more carefully remove the effects of very large galaxies and nebulae may be implemented. Removing galaxies and nebulae by replacing the relevant pixels by the median brightness of the initial image 100 is extremely effective for small deep-sky objects. However, if galaxies or nebulae fill most of an image, replacing these objects by the median brightness may, in some embodiments, remove most of the satellite trail. An algorithm may be employed that addresses such images by determining a brightness profile for each galaxy or nebula using deep learning or a polynomial fit, for example. This may greatly improve the functionality of the method for these types of images. In some embodiments, the methods may locate and remove satellite trails that do not pass fully through the initial image 100.

The methods described herein may first preprocess the initial image 100 by removing celestial bodies 106 and outlier pixels 420. In some embodiments, the preprocessing removes the stars 108 and outlier pixels 420. The methods may then determine the location of the satellite trail 104 in the image 500 by examining at least one of the lines in the image 500. In some embodiments, the methods may include using recursive scaling to improve processing speed. The methods may fit the satellite trail wobble, brightness, and standard deviation using Gaussian cross-correlations, curvilinear transformations, and/or Fourier Transforms. The methods may compute the values of the fitted trail Gaussian for all pixels and subtract these values from the initial image 100.

Embodiments described here may (a) remove stars and outlier pixels from the initial image 100 to greatly improve satellite detectability; (b) test all possible lines through the image 500 for satellite trails; (c) use a piecewise bivariate cubic fit for interpolation instead of linear interpolation for more accurate Gaussian approximation; (d) recursively scale images to greatly reduce processing time; (e) fit satellite trail wobble using Gaussian cross-correlation to reduce fit noise; (f) use a modified Fast Fourier Transform for improved fits; (g) use curvilinear transformations to flatten the satellite trail; and/or (h) ignore points influenced by celestial bodies or outlier pixels to improve trail fits.

Figure 14:
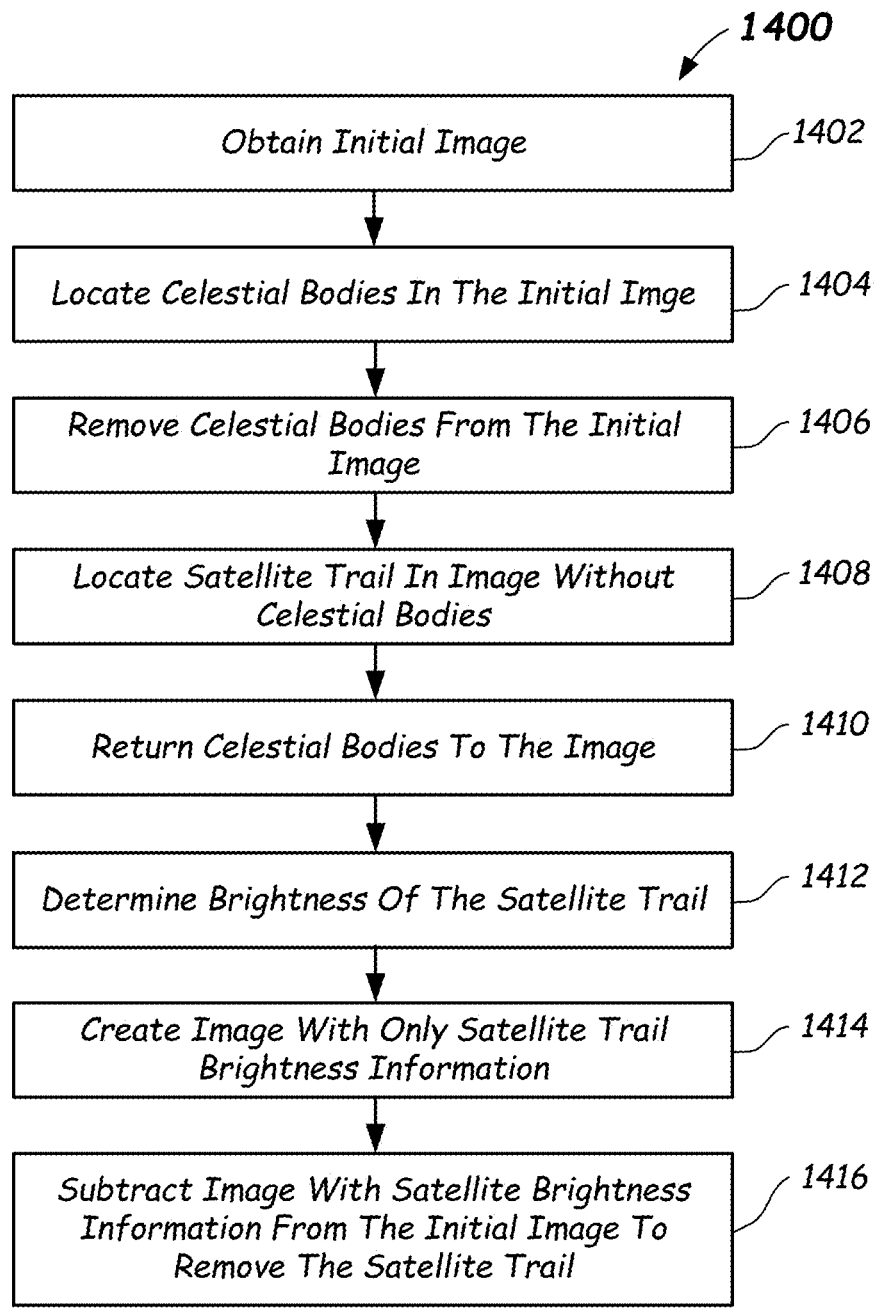
FIG. 14 is a flowchart illustrating an example method of removing satellite trails from an initial image in accordance with one or more embodiments.

Additional reference is made to FIG. 14, which is a flowchart illustrating an example method 1400 of removing satellite trails from an initial image in accordance with embodiments provided herein. With reference to FIG. 14, at Block 1402, an initial image is obtained (e.g., initial image 100). For example, a FIT, flexible image transport system (FITS), or other file type image containing celestial bodies 106 may be obtained. Celestial bodies may include any object that may be imaged by the system 200 (FIG. 2). In Block 1404, celestial bodies 106 within the initial image 100 are located. In some embodiments, the initial image 100 may be plate solved to obtain the location of the celestial bodies 106 within the initial image 100. Other techniques for locating the celestial bodies 106 may be used.

In Block 1406, the celestial bodies 106 are removed from the initial image 100. In some embodiments, the radius of each of the celestial bodies 106 may be determined by detecting when the brightness of the celestial bodies 106 drops as a function of radial distance from the centers of the celestial bodies 106. For example, brightness of the celestial bodies 106 may be detected near the center of the stars 108 and/or celestial bodies 106 and then at incrementally further radial distances from the centers of the celestial bodies 106 to determine the boundaries of the celestial bodies 106. In one or more embodiments, the brightness at multiple (e.g., 4-10) equally spaced points at the same radial distance may be averaged to determine an average brightness at that radial distance. If the brightness is below the median brightness of background, the radial distance may be used as the boundary for the celestial bodies 106.

When the radius of each of the celestial bodies 106 to be removed have been determined, all points within the celestial bodies 106 up to the determined radius may be changed to a reduced brightness level (e.g., a median brightness for the image, or another suitable brightness level). This effectively removes the celestial bodies 106 from the initial image 100. This process may be applied to individual ones of the celestial bodies 106 in the initial image 100.

In Block 1408, the satellite trail 104 is located in the image 500 in which the celestial bodies 106 were removed. In some embodiments, all lines going in and out of the image through lattice points may be examined to determine the line with the greatest average brightness. For large (e.g., high resolution) images, millions or even tens of millions of lines may need to be examined. Some embodiments may test lines that lie between lattice points. To speed up identification of the brightest line (e.g., the satellite trail 104), in some embodiments, the resolution of the image 500 may be reduced until a smaller number (e.g., under 20,000) of lines extend through the image 500. Once the brightest line is identified within the reduced resolution image, the resolution of the image may be increased and the line location information may be refined in the higher resolution image. In some embodiments, the resolution of the image may be repeatedly decreased until the satellite trail location is identified and then repeatedly increased to refine the accuracy of the satellite trail location. For example, the image's resolution may be decreased by a factor of 1/10, 1/4, 1/2, etc., and/or increased by a factor of 2, 4, 10, etc. Other resolution adjustment factors may be used.

In Block 1410, once the satellite trail 104 has been identified in the image 500, the stars 108 and/or celestial bodies 106 may be returned to the image (e.g., the original brightness values of the stars 108 and/or celestial bodies 106 may be returned to the image).

In Block 1412, the brightness of the satellite trail 104 is determined. In some embodiments, a function may be fit to the brightness data along the satellite trail 104. For example, a Gaussian function or similar function may be employed. In some embodiments, brightness values of pixels along the satellite trail 104 and a predetermined distance, such as a user-specified distance, from the satellite trail may be employed to fit a function (e.g., a Gaussian function) to the brightness data of the satellite trail 104. In some embodiments, pixels up to 6-20 pixels away from the satellite trail 104 may be used to fit a function to the satellite trail brightness. In one or more embodiments, each point on the initial image 100 may be characterized as having a distance along the satellite trail 104 (parallel to the satellite trail 104) and a distance perpendicularly away from the satellite trail 104. The brightness function then may be represented by equation (16) or other equations.

Figure 5:
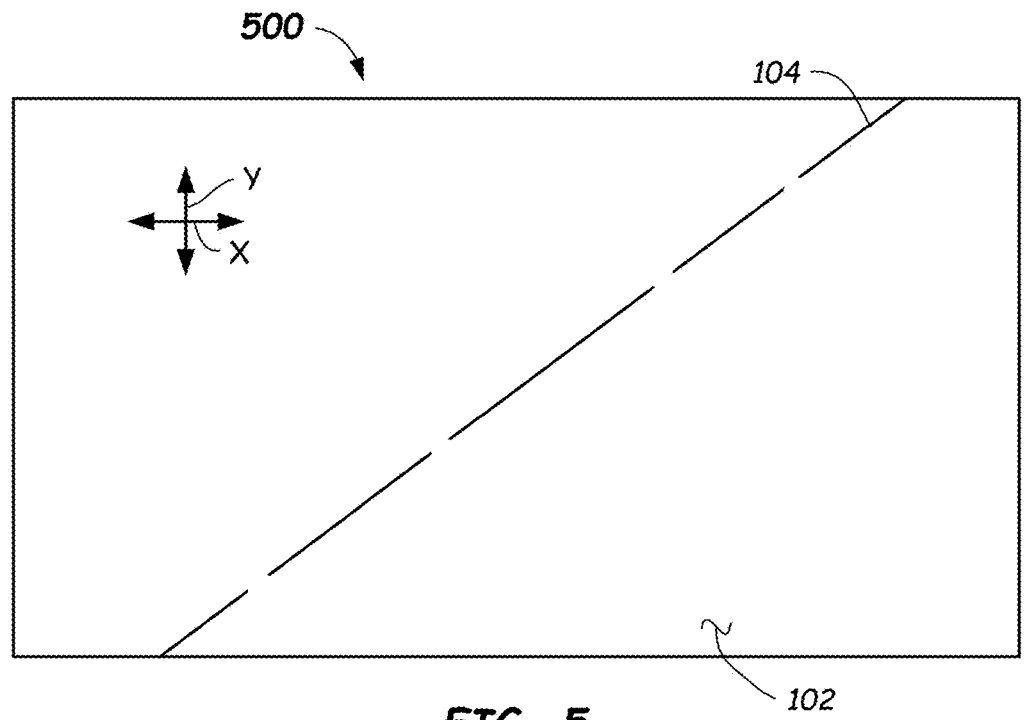
FIG. 5 illustrates the initial image of FIG. 1 with both the celestial bodies and the outlier pixels removed according to one or more embodiments.
Figure 12:
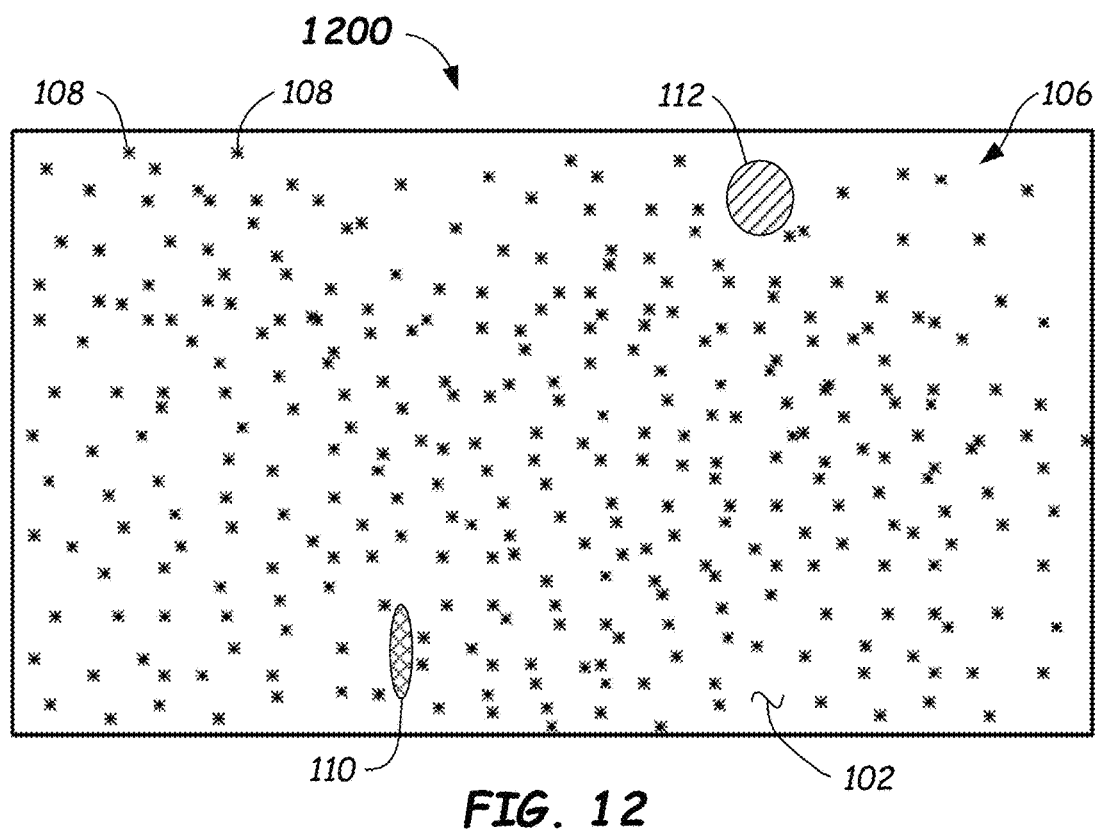
FIG. 12 illustrates the initial image of FIG. 1 with the satellite trail removed according to one or more embodiments.

By fitting a curve to the brightness data along the satellite trail 104, a measure of the effects on the satellite trail 104 may then be determined across the entire initial image 100. For example, in block 1414, the brightness function determined for the satellite trail 104 may be used to calculate a brightness value for each pixel location within the initial image 100. This creates an image with only satellite trail brightness information as shown in FIG. 5. This image may then be subtracted from the initial image 100 to remove the satellite trail per block 1416, as shown in FIG. 12.

In general, methods of removing a satellite trail 104 from an initial image 100 is provided. A method may include (a) obtaining an initial image 100 having celestial bodies 106 (e.g., FIG. 1); (b) locating the celestial bodies 106 in the initial image 100; (c) removing the located celestial bodies 106 from the initial image 100 to form a star-removed image 500 (e.g., FIG. 5); (d) locating the satellite trail 104 in the star-removed image 500; (e) determining brightness information for the satellite trail 104 in the initial image 100; (f) creating a satellite-trail-containing image with only satellite trail brightness information based on the determined brightness information; and (g) subtracting the satellite-trail-containing image from the initial image 100 to remove the satellite trail 104 so as to form a satellite-trail-removed image (e.g., FIG. 12). The method may include displaying the satellite-trail-removed image on the display 220.

Accordingly, while the present disclosure has been disclosed in connection with the example embodiments thereof, it should be understood that other embodiments may fall within the spirit and scope of the disclosure, as defined by the following claims.

The invention claimed is:

1. A method of removing a satellite trail from an image comprising:
   obtaining an initial image having stars;
   locating stars in the image;
   removing the located stars from the initial image to form a star-removed image;
   locating the satellite trail in the star-removed image;
   determining brightness information for the satellite trail in the initial image including trail wobble information;
   creating a satellite-trail-containing image with only satellite trail brightness information based on the determined brightness information; and
   subtracting the satellite-trail-containing image from the initial image to remove the satellite trail so as to form a satellite-trail-removed image.

2. The method of claim 1 further comprising displaying the satellite-trail-removed image.

3. The method of claim 1 wherein the initial image comprises a FIT or FITS file type image.

4. The method of claim 1 wherein the initial image is plate solved to locate the stars in the image.

5. The method of claim 1 wherein the removing the located stars comprises determining a radius of each star by detecting when brightness of the star drops as a function of radial distance from the star's center.

6. The method of claim 1 wherein the locating the satellite trail comprises:
   reducing resolution of the image to identify a brightest line extending through the image; and
   increasing the resolution of the image to refine location information of the brightest line.

7. The method of claim 1 wherein the determining brightness information for the satellite trail comprises employing brightness values of pixels along the satellite trail and a predetermined distance of the pixels from the satellite trail to fit a function representing brightness data along the satellite trail.

8. The method of claim 7 wherein the function is a Gaussian function.

9. The method of claim 7 wherein the function is represented by:

$$b(par, perp)e = p(par)^{\frac{-perp^2}{2\sigma^2}}$$

wherein b is brightness, par is the distance parallel to the satellite trail, p is a function dependent on par, σ is standard deviation, and perp is the distance perpendicular to the satellite trail.

10. A system for removing a satellite trail from an image comprising:
a telescope having an imaging device; and
a controller in communication with the telescope, the controller including a memory for storing instructions that when executed by the controller cause the controller to:
receive an initial image having stars;
locate stars in the image;
remove the located stars from the initial image to form a star-removed image;
locate the satellite trail in the star-removed image;
determine brightness information for the satellite trail in the initial image including trail wobble information;
create a satellite-trail-containing image with only satellite trail brightness information based on the determined brightness information; and
subtract the satellite-trail-containing image from the initial image to remove the satellite trail so as to form a satellite-trail-removed image.

11. The system of claim 10 further comprising a display in communication with the controller, wherein the instructions stored in the memory when executed by the controller further cause the controller to display the satellite-trail-removed image on the display.

12. The system of claim 10 wherein the controller comprises a microprocessor, a smartphone, or a computer.

13. The system of claim 10 wherein the initial image comprises a FIT or FITS file type image.

14. The system of claim 10 wherein the initial image is plate solved to locate the stars in the image.

15. The system of claim 10 wherein the instructions stored in the memory when executed by the controller further cause the controller to locate stars in the image by determining a radius of each star by detecting when brightness of the star drops as a function of radial distance from the star's center.

16. The system of claim 10 wherein the instructions stored in the memory when executed by the controller further cause the controller to locate the satellite trail in the star-removed image by:
reducing resolution of the image to identify a brightest line extending through the image; and
increasing the resolution of the image to refine location information of the brightest line.

17. The system of claim 10 wherein the instructions stored in the memory when executed by the controller further cause the controller to determine brightness information for the satellite trail by employing brightness values of pixels along the satellite trail and a predetermined distance of the pixels from the satellite trail to fit a function representing brightness data along the satellite trail.

18. The system of claim 17 wherein the function is a Gaussian function.

19. The system of claim 17 wherein the function is represented by:

$$b(par, perp)e = p(par)^{\frac{-perp^2}{2\sigma^2}}$$

wherein b is brightness, par is the distance parallel to the satellite trail, p is a function dependent on par, σ is standard deviation, and perp is the distance perpendicular to the satellite trail.

20. The system of claim 10 wherein the instructions stored in the memory when executed by the controller further cause the controller to return the stars to the star-removed image in response to determining brightness information for the satellite trail in the initial image.

* * * * *